(12) United States Patent
von der Lippe et al.

(10) Patent No.: US 11,281,753 B2
(45) Date of Patent: Mar. 22, 2022

(54) METHOD AND DEVICE FOR THE SECURE VERIFICATION OF THE OPENING OF A SAFE DOOR

(71) Applicant: Wincor Nixdorf International, GmbH, Paderborn (DE)

(72) Inventors: Carsten von der Lippe, Paderborn (DE); Dennis Mols, Paderborn (DE); Frank Huneke, Bad Driburg (DE)

(73) Assignee: Wincor Nixdorf International Gmbh, Paderborn (DE)

( * ) Notice: Subject to any disclaimer, the term of this patent is extended or adjusted under 35 U.S.C. 154(b) by 333 days.

(21) Appl. No.: 16/677,759

(22) Filed: Nov. 8, 2019

(65) Prior Publication Data
US 2020/0151306 A1    May 14, 2020

(30) Foreign Application Priority Data
Nov. 8, 2018  (EP) .................................... 18205153

(51) Int. Cl.
*G06F 21/31* (2013.01)
*G07F 19/00* (2006.01)

(52) U.S. Cl.
CPC .......... *G06F 21/316* (2013.01); *G07F 19/205* (2013.01)

(58) Field of Classification Search
CPC .............................. G06F 21/316; G07F 19/205

USPC ........................................................... 726/17
See application file for complete search history.

(56) References Cited

U.S. PATENT DOCUMENTS

2006/0152339 A1* 7/2006 Mercier .................. G07F 17/12
340/5.73

FOREIGN PATENT DOCUMENTS

| EP | 0493127 A2 | 7/1992 |
|---|---|---|
| EP | 1367547 A2 | 12/2003 |
| GB | 2246899 A | 2/1992 |
| WO | 2016009532 A1 | 1/2016 |

OTHER PUBLICATIONS

Extended European Search Report filed in the corresponding European Application; 8 pages.

* cited by examiner

*Primary Examiner* — Jacob Lipman
(74) *Attorney, Agent, or Firm* — Black, McCuskey, Souers & Arbaugh LPA (57) ABSTRACT

A method and a device for secure verification of opening of a safe door of a safe, in particular a safe door of a safe of an automated teller machine, includes a safe door and storage compartments for cash boxes that are arranged relative to each other such that the cash boxes can only be removed from and inserted into the storage compartments when the safe door is open. A control unit verifies an opening of the safe door by checking if cash boxes have been removed from the safe and have been inserted into the safe in swapped order compared to a first operating state.

28 Claims, 7 Drawing Sheets

METHOD AND DEVICE FOR THE SECURE VERIFICATION OF THE OPENING OF A SAFE DOOR

CROSS-REFERENCE TO RELATED APPLICATIONS

This application claims priority to and the benefit of European Patent Application No. EP 18 205 153.2, filed Nov. 8, 2018.

BACKGROUND

This relates in general to methods and devices for verification related to automated teller machines.

Methods are known in which predetermined service operating modes of an automated teller machine are only enabled whenever a preceding authentication of an authorized user has been successful. Typically, the user is authenticated in that he/she opens the safe door of a safe of the automated teller machine. The opening of the safe door is in particular detected by a door sensor.

However, automated teller machines have been increasingly subjected to attacks in which, in particular with the aid of endoscopes, a manipulation of the communication cables in the automated teller machines results in that the opening of the safe door by an authorized user is only simulated. This means that in the case of a corresponding further manipulation after the authentication, a non-authorized cash withdrawal from the automated teller machine is possible.

SUMMARY

This relates more particularly to a method and a device for the secure verification of the opening of a safe door of a safe, in particular a safe door of a safe of an automated teller machine.

In at least one embodiment, a method and a device are provided for the secure verification of the opening of a safe door so that a particularly high protection against manipulations of the safe door by unauthorized third parties is achieved.

In at least one embodiment, a method includes a first reading operation the value of a parameter is read from a memory area of a cash box accommodated in a first storage compartment of the safe and is stored in a memory area of a control unit as a first parameter value. In a second reading operation, the parameter value is read from a memory area of a cash box accommodated in a second storage compartment of the safe and is stored as a second parameter value in a memory area of the control unit. In a third reading operation, the parameter value is read from a memory area of a cash box accommodated in the first storage compartment and is stored in a memory area of the control unit as a third parameter value. In a fourth reading operation, the parameter value is read from a memory area of a cash box accommodated in the second storage compartment and is stored in a memory area of the control unit as a fourth parameter value. With the aid of the control unit, it can be checked whether the first parameter value differs from the third parameter value and/or whether the second parameter value differs from the fourth parameter value. When the first parameter value differs from the third parameter value and/or the second parameter value differs from the fourth parameter value, an opening of the safe door is verified by the control unit. As a result, it is achieved that an initially assumed opening of the safe door is actually checked.

It is particularly advantageous when in a fifth reading operation the value of a parameter is read from a memory area of a cash box accommodated in a third storage compartment of the safe and is stored in a memory area of the control unit as a fifth parameter value, when in a sixth reading operation the parameter value is read from a memory area of a cash box accommodated in a fourth storage compartment of the safe and is stored in a memory area of the control unit as a sixth parameter value, when in a seventh reading operation the parameter value is read from a memory area of a cash box accommodated in the third storage compartment of the safe and is stored in a memory area of the control unit as a seventh parameter value, when in an eighth reading operation the parameter value is read from a memory area of a cash box accommodated in the fourth storage compartment of the safe and is stored in a memory area of the control unit as an eighth parameter value. With the aid of the control unit, it can be checked whether the first parameter value differs from the third parameter value and/or whether the second parameter value differs from the fourth parameter value and/or whether the fifth parameter value differs from the seventh parameter value and/or whether the sixth parameter value differs from the eighth parameter value. When the first parameter value differs from the third parameter value and/or the second parameter value differs from the fourth parameter value and/or the fifth parameter value differs from the seventh parameter value and/or the eighth parameter value differs from the sixth parameter value, an opening of the safe door is verified by the control unit. As a result, it is achieved that each exchange of cash boxes in the storage compartments is reliably detected.

It is particularly advantageous when the first, the second, the fifth and/or the sixth reading operation is triggered when it is signaled to the control unit with the aid of a door sensor that the door is closed, and when the third, the fourth, the seventh and/or the eighth reading operation is triggered when it is signaled to the control unit with the aid of the door sensor that the door is open and a period of time stored in preset manner has expired. Alternatively or additionally, the first, the second, the fifth and/or the sixth reading operation can be triggered by an input via an operating panel. Further, alternatively or additionally, the third, the fourth, the seventh and/or the eighth reading operation can likewise be triggered by an input via the operating panel. As a result, it is achieved that the allocation of the cash boxes to the respective storage compartments is known both in the open and in the closed state of the safe.

It is particularly advantageous when the safe door and the storage compartments are arranged relative to each other such that the cash boxes are only removable from and/or insertable into the storage compartments when the safe door is open. As a result, it is achieved that a manipulation of the automated teller machine is prevented when the safe door is closed so that a particularly high security level is achieved.

Further, it is advantageous when the control unit identifies the action of an authorized user by the verification of the actual opening of the safe door and authenticates the user by this action. As a result, it is proven that the safe door has been opened by an actually authorized user so that a manipulation by an unauthorized third party is prevented.

It is particularly advantageous when a service operating mode is enabled with the aid of the control unit as soon as the control unit has verified the opening of the safe door. As a result, it is guaranteed that only authorized users have access to predetermined service operating modes.

Further, it is advantageous when the respective parameter value corresponds to an arbitrary character sequence of letters and/or numerical values, in particular a serial number.

Thus, a particularly easy identification of the cash box is achieved.

In a further advantageous embodiment, the respective parameter value corresponds to the nominal value of the notes of value stored in the respective cash box. It is particularly advantageous when the respective parameter value corresponds to a unique identification of an RFID tag connected to the cash box. As a result, it is achieved that each cash box is easily identifiable in the safe and unambiguously differs from the other cash boxes accommodated in the safe.

It is particularly advantageous when the parameter values are transmitted by means of a data transmission connection, preferably via a secure data transmission connection from the cash boxes and/or the verification adapter to the control unit, the data in particular being transmitted via infrared, WLAN, cable or via a bus system. As a result, in particular a particularly secure data transmission is achieved.

In a particularly advantageous embodiment, an RFID chip comprises the memory area from which the parameter value is read with the aid of a reading unit, the parameter value preferably reading a unique identification stored in a memory area of the RFID chip. As a result, a particularly easy, space-saving and unambiguous identification of the cash box is achieved.

Further embodiments relate to a method in which in a first reading operation the value of a parameter is read from a memory area of a cash box accommodated in a storage compartment of the safe and is stored in a memory area of a control unit as a first parameter value. In a second reading operation, the value of a parameter is read from a memory area of a verification adapter accommodated in the storage compartment of the safe and is stored in a memory area of the control unit as a second parameter. With the aid of the control unit it is then checked whether the first parameter value differs from the second parameter value. When the first parameter value differs from the second parameter value, an opening of the safe door is verified by the control unit. As a result, an assumed opening of the safe door is actually checked.

Further, it is advantageous when the first reading operation is triggered when it is signaled to the control unit with the aid of a door sensor that the safe door is closed. The second reading operation can then be triggered when it is signaled to the control unit with the aid of the door sensor that the door is open and when a period of time stored in a preset manner has expired. Alternatively or additionally, the first and/or the second reading operation can be triggered by an input via an operating panel. As a result, a particularly secure method is achieved that is protected against manipulations from outside.

Further features and advantages are described in the following description which, in connection with the enclosed Figures, explains in greater detail various embodiments.

DETAILED DESCRIPTION

Figure 1:
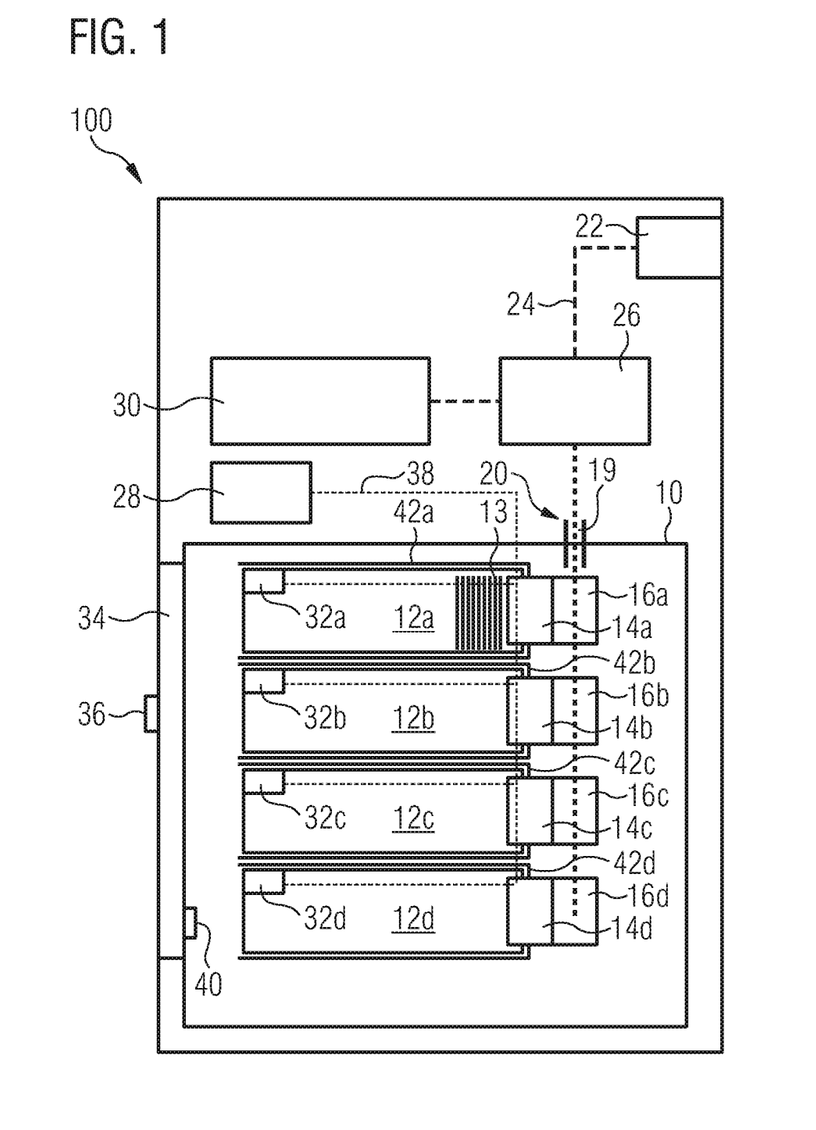
FIG. 1 is a schematic illustration of an automated teller machine in a first operating state according to a first embodiment.

Referring now to the drawings, there is illustrated in FIG. 1 an automated teller machine 100 in a first operating state according to a first embodiment. The automated teller machine 100 serves both for the deposit of notes of value by a user and for the withdrawal of notes of value by a user. Such an automated teller machine 100 which serves both for the deposit and the withdrawal of notes of value is also referred to as recycling automated teller machine. Alternatively, the automated teller machine 100 may also only serve for the withdrawal of notes of value or for the deposit of notes of value. Further, the inventive method and the inventive device may also be used in other value note handling devices, in particular in automatic cash systems and so-called automatic cash safes.

The automated teller machine 100 comprises a safe 10 in which four cash boxes 12a to 12d are arranged and which protects the cash boxes 12a to 12d against unauthorized access, in particular against theft and manipulation attempts. The safe 10 has a safe door 34 which can be opened and closed via a closing unit 36. The cash box 12a is arranged in a first storage compartment 42a, the cash box 12b is arranged in a second storage compartment 42b, the cash box 12c is arranged in a third storage compartment 42c and the cash box 12d is arranged in a fourth storage compartment 42d.

The cash boxes 12a to 12d serve to store and transport notes of value. The notes of value are deposited in the cash boxes 12a to 12d in the form of a stack. One of these stacks is exemplarily indicated in the first cash box 12a. One of the notes of value of this value note stack is exemplarily identified by the reference sign 13. In the operating position of the cash boxes 12a to 12d shown in FIG. 1, the notes of value are arranged in the cash boxes 12a to 12d so as to stand on one of their edges, preferably on one of their longitudinal edges.

Each cash box 12a to 12d has a respective opening for feeding notes of value 13 and for removing notes of value 13. In front of the opening of each cash box 12a to 12d, a respective separating and stacking unit 14a to 14d is arranged, with the aid of which, on the one hand, notes of value 13 can be fed to the cash boxes 12a to 12d and, on the other hand, notes of value 13 stored in the cash boxes 12a to 12d can be separated from each of the value note stacks stored in the cash box 12a to 12d and can be removed from the cash box 12a to 12d. In front of each separating and stacking unit 14a to 14d, a respective switch 16a to 16d is arranged, with the aid of which a note of value 13 to be fed to the cash boxes 12a to 12d is branched off from the transport path 19 and fed to that one separating and stacking unit 14a to 14d that is arranged in front of that one cash box 12a to 12d into which the note of value 13 is to be transported.

The switches 16a to 16d also serve for the transport of notes of value 13 that have been removed from the cash boxes 12a to 12d to the transport path 19. Further, the safe 10 has an opening 20 through which notes of value 13 transported along the transport path 19 can be transported into the safe 10 and out of the safe 10.

Further, the automated teller machine 100 comprises an input and output compartment 22 via which notes of value 13 to be deposited are input into the automated teller machine 100 by a user, and notes of value 13 to be dispensed are output to a user. In the case of a mere cash dispensing machine, notes of value 13 are only dispensed via the input and output compartment 22, whereas in the case of a mere cash depositing machine, notes of value are only deposited via the input and output compartment 22. The notes of value 13 are transportable with the aid of a first transport unit 24 preferably comprising several transport elements between the input and output compartment 22 and a reading unit 26.

With the aid of a second transport unit preferably comprising several transport elements the notes of value 13 are transported along the transport path 19 from the reading unit 26 to the cash boxes 12a to 12d and from the cash boxes 12a to 12d to the reading unit 26, respectively. The notes of value 13 deposited via the input and output compartment 22 are separated and, with the aid of the first transport unit 24, are individually fed to the reading unit 26, with the aid of which the authenticity of the deposited notes of value 13 and/or the nominal value and/or the serial number of each deposited note of value 13 are determined.

The cash boxes 12a to 12d are cash boxes to which notes of value 13 can be fed as well as from which notes of value 13 can be removed, i.e. so-called recycling cash boxes. In the cash box 12a only notes of value 13 with a first nominal value are stored. Such a storage of notes of value 13 of only one nominal value in a cash box 12a to 12d is referred to as a storage according to type. In the second cash box 12b, notes of value with a second nominal value are stored. In the third cash box 12c, notes of value with a third nominal value and in the fourth cash box 12d notes of value with a fourth nominal value are stored.

In an alternative embodiment, a cash box 12a to 12d may be provided as a deposit box, in which notes of value 13 are stored which are suspected of being counterfeit and notes of value 13 which shall not be dispensed again due to their nominal value.

In a further alternative embodiment, a mixed storage, i.e. a storage of notes of value 13 with different nominal values can be provided in the cash boxes 12a to 12d. In a further alternative embodiment, also at least one cash box 12a to 12d may be designed as a withdrawal-only cash box 12a to 12d or a deposit-only cash box 12a to 12d.

In the case of a withdrawal of notes of value 13, a user inputs with the aid of a non-illustrated input unit, in particular with the aid of a touch screen, which amount of money he/she wishes to withdraw. With the aid of a control unit 28 it is determined which notes of value 13 are required in order to output the desired amount of money via the input and output compartment 22 to the user. The notes of value 13 to be dispensed are removed from the cash boxes 12a to 12d and fed with the aid of the first transport unit 24 and the second transport unit to the input and output compartment, where they are output to the user in the form of a stack.

If, for a withdrawal, a note of value 13 is required that is—in pull-off order—arranged behind other notes of value 13 that are not suitable for a withdrawal, then these notes of value not suitable for a withdrawal are preferably transported into an intermediate storage 30, the note of value 13 to be dispensed is taken from the cash box 12a to 12d and fed to the input and output unit 22. The intermediate storage 30 is in particular a drum module or another endless transport path. Alternatively, the intermediate storage 30 may also be designed as a stack module, in particular as a cash box.

Each of the cash boxes 12a to 12d comprises one respective memory element with a memory area 32a to 32d in which at least the value of a parameter of the cash boxes 12a to 12d is stored. In the embodiment described, the parameter is the serial number of the cash boxes 12a to 12d, the value of which consists of an arbitrary character sequence comprising letters and/or digits.

In an alternative embodiment, the parameter may also be the nominal value and/or the currency of the notes of value stored in the cash boxes 12a to 12d.

The parameters may electronically be written into the respective memory area 32a to 32d of the cash box 12a to 12d and electronically be read from the memory area 32a to 32d, in particular written and read in a non-contact manner. The memory area 32a to 32d in which the parameter value is stored is a non-volatile memory, preferably a ROM, an EPROM, and/or a flash memory, such as an EEPROM. In an alternative embodiment, the respective memory with the memory area 32a to 32d is contained in an RFID chip, the parameter value preferably being a unique identification stored in a memory area of the RFID chip.

The parameter values, in the present embodiment the serial numbers, are transmitted by means of a preferably secure data transmission connection 38 from the cash boxes 12a to 12d to the control unit 28. The data may be transmitted via infrared, WLAN, cable or via a bus system.

In the operating state according to FIG. 1, the safe door 34 is closed. This state is detected by a door sensor 40 and signaled to the control unit 28. When the safe door 34 is closed, a first reading operation is triggered in which the serial number is read from the memory area 32a to 32d of that one cash box 12a to 12d that is received in the storage compartment 42c. In the present embodiment, the serial number of the cash box 12c is read in the first reading operation by the control unit 28 and is stored as a first serial number in a memory area of the control unit 28.

Further, a second reading operation is triggered in which the serial number of that one cash box 12a to 12d that is accommodated in the storage compartment 42d is read out. In the present embodiment, the serial number of the cash box 12d is read out in the second reading operation by the control unit 28 and is stored as a second serial number in a memory area of the control unit 28. Thus, by means of the control unit 28 the cash boxes 12c and 12d are allocated to the respective storage compartments 42c and 42d with the aid of the serial numbers.

Figure 2:
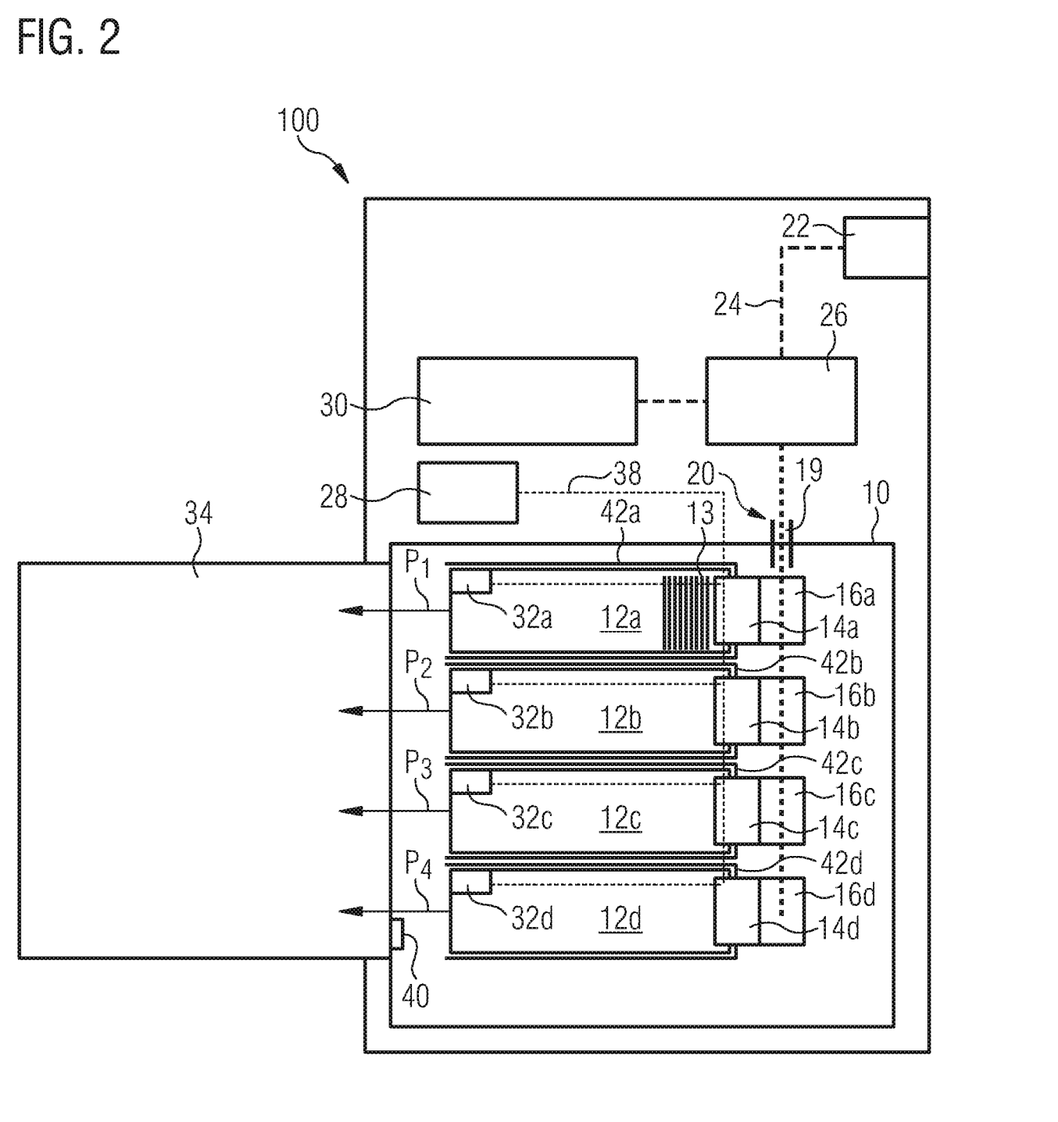
FIG. 2 is a schematic illustration of the automated teller machine according to FIG. 1 in a second operating state.

FIG. 2 shows the automated teller machine 100 in a second operating state. Elements having the same function or the same structure are identified with the same reference signs. In the second operating state according to FIG. 2, the safe door 34 is opened, and the opening of the safe door 34 is signaled to the control unit 28 with the aid of the door sensor 40. When the safe door 34 is opened, the cash boxes 12a to 12d are removable in the direction of the arrows P1 to P4 from the safe 10 from the respective storage compartments 42a to 42d.

Figure 3:
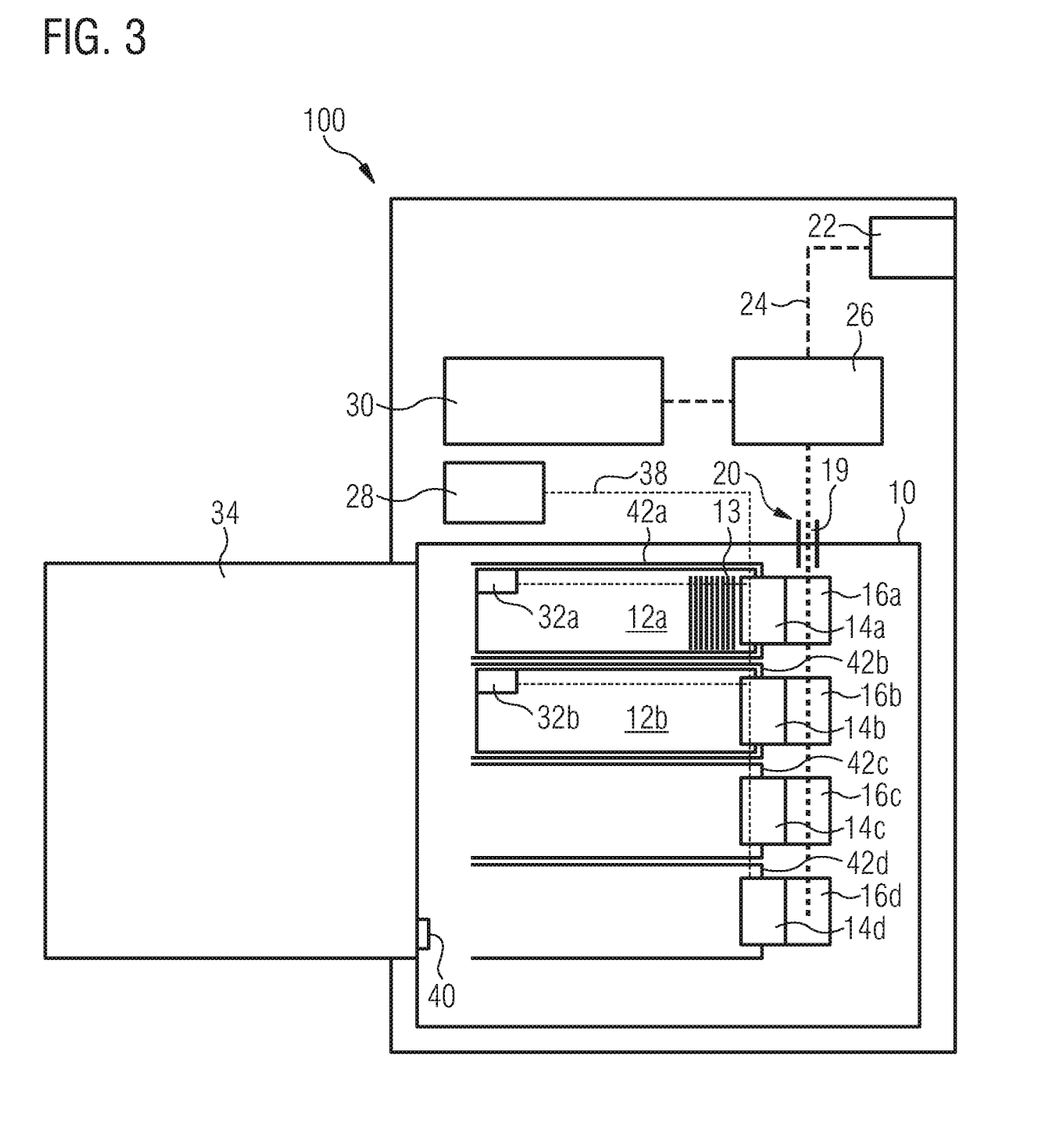
FIG. 3 is a schematic illustration of the automated teller machine according to the preceding FIGS. in a third operating state.

FIG. 3 shows a third operating state in which the cash boxes 12c and 12d have been removed from the safe 10. The storage compartments 42a to 42d and the safe door 34 are arranged such that the cash boxes can only be removed when the safe door 34 is open. In the third operating state according to FIG. 3, the storage compartments 42c and 42d are empty, i.e. no cash box 12a to 12d is accommodated therein.

Figure 4:
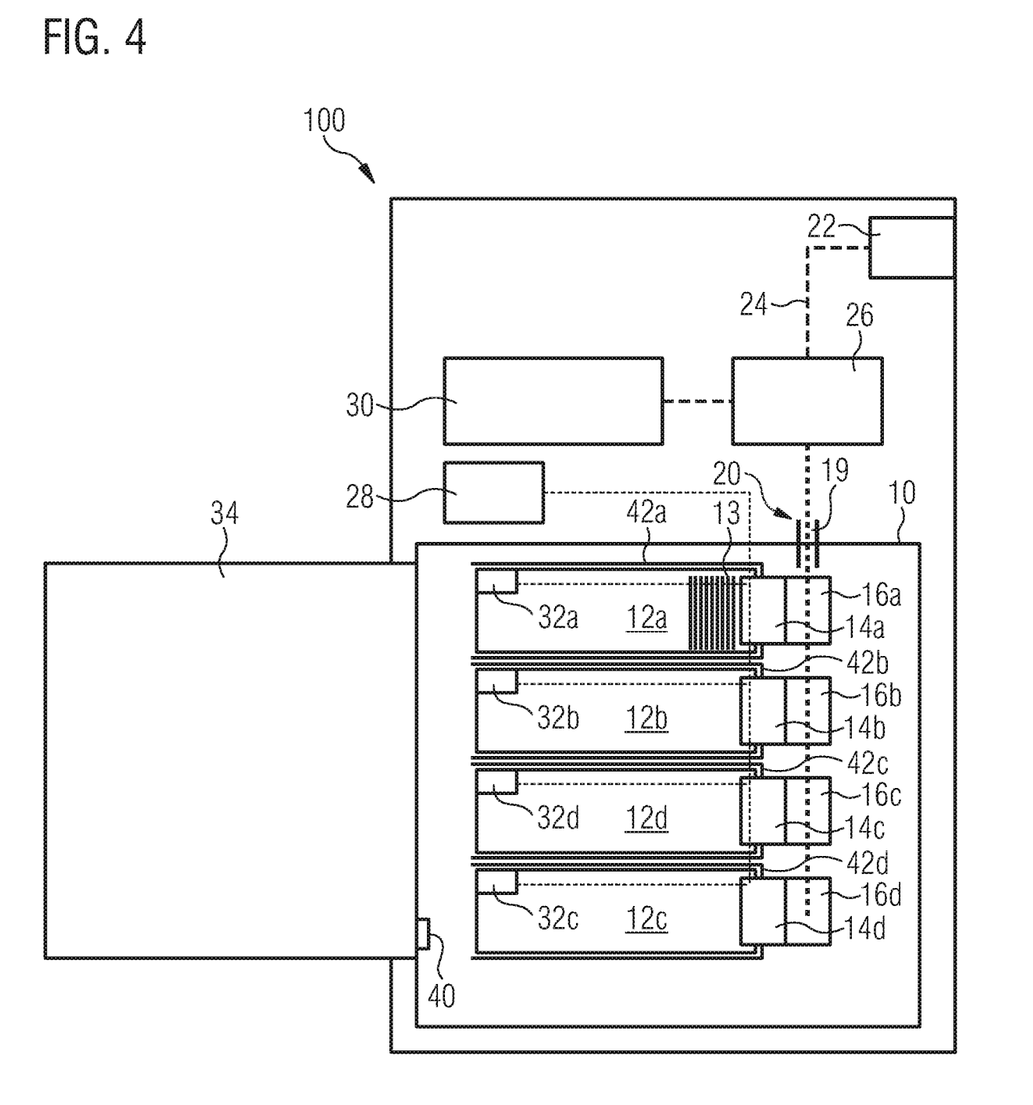
FIG. 4 is a schematic illustration of the automated teller machine according to the preceding FIGS. in a fourth operating state.

FIG. 4 shows a fourth operating state of the automated teller machine 100, in which the removed cash boxes 12c and 12d have been inserted into the safe 10 in swapped order with respect to FIGS. 1 to 2.

Preferably, for the removal of the cash boxes 12c and 12d and their reinsertion into the safe 10 in swapped order a maximum admissible period of time is stored in a preset manner so that a user has at most the amount of time stored in a preset manner for exchanging the cash boxes. This period of time is preset to a value in the range from 30 s to 5 minutes as from a detection of the opening of the door by the door sensor 40, and preferably to one minute.

After expiration of the maximum period of time or alternatively by a user input, a third reading operation is triggered in which the serial number is read from the memory area 32a to 32d of that one cash box 12a to 12d that is accommodated in the storage compartment 42c. In the present embodiment, the serial number of the cash box 12d is read out in the third reading operation by the control unit 28 and is stored as a third serial number in a memory area of the control unit 28.

Further, a fourth reading operation is triggered in which the serial number of that one cash box 12a to 12d that is accommodated in the storage compartment 42d is read out. In the present embodiment, the serial number of the cash box 12c is read out in the fourth reading operation by the control unit 28 and stored as a fourth serial number in a memory area of the control unit 28. Thus, by the control unit an allocation of the cash box 12c to the storage compartment 42d and of the cash box 12d to the storage compartment 42c is made.

After termination of the fourth reading operation, the control unit 28 checks whether the first and the third serial number and/or the second and the fourth serial number differ from each other. When these differ from each other, the control unit 28 verifies that the safe door 34 has actually been opened.

The exchange of the cash boxes 12c and 12d described in connection with the first embodiment can only be implemented by people who, by opening the safe door 34, have access to the storage compartments 42a to 42d and the cash boxes 12a to 12d accommodated therein and who, preferably within the preset period of time, exchange these according to a rule of exchange preferably stored in a preset manner.

In an alternative embodiment, the serial number is read in the first reading operation from the memory area 32a to 32d of that one cash box 12a to 12d that is accommodated in the storage compartment 42a and/or in the storage compartment 42b and/or in the storage compartment 42c and/or in the storage compartment 42d. In the third operating state, further the cash boxes 12a and 12b or the cash boxes 12a and 12c or the cash boxes 12a and 12d, or the cash boxes 12b and 12c, or the cash boxes 12b and 12d can be removed. In the fourth operating state of the automated teller machine 100, the removed cash boxes 12a, 12b, 12c, 12d are inserted into the safe 10 in swapped order as compared to the first operating state.

In an alternative embodiment in the third operating state three of the cash boxes 12a to 12d are removed and inserted in swapped order in the fourth operating state. In another preferred embodiment in the third operating state all of the cash boxes 12a to 12d are removed and inserted into the safe 10 in swapped order in the fourth operating state.

Rules of exchange may in particular be the exchange of the cash box 12a for the cash box 12b and/or the exchange of the cash box 12c for the cash box 12d; the exchange of the cash box 12a for the cash box 12c and/or the exchange of the cash box 12b for the cash box 12d; the exchange of the cash box 12a for the cash box 12d and/or the exchange of the cash box 12b for the cash box 12c.

By verifying that the safe door 34 has actually been opened, the control unit 28 identifies the action of an authorized user, since this user has proven the actual access to the inside of the safe. The user is authenticated by this action.

Authentication means the confirmation of the authorization for implementing certain actions by the user so that based on the authentication of the user the actions are enabled by the control unit 28. From an authentication a simple verification is to be distinguished in which merely an identity is determined, its authenticity, however, is not checked. Further, verification means checking the validity, i.e. it is proved that an assumption is actually true so that by means of a verification an authentication is made possible.

As soon as the control unit 28 has verified the opening of the door 34, in particular a service operating mode of the automated teller machine 100 is enabled.

Figure 5:
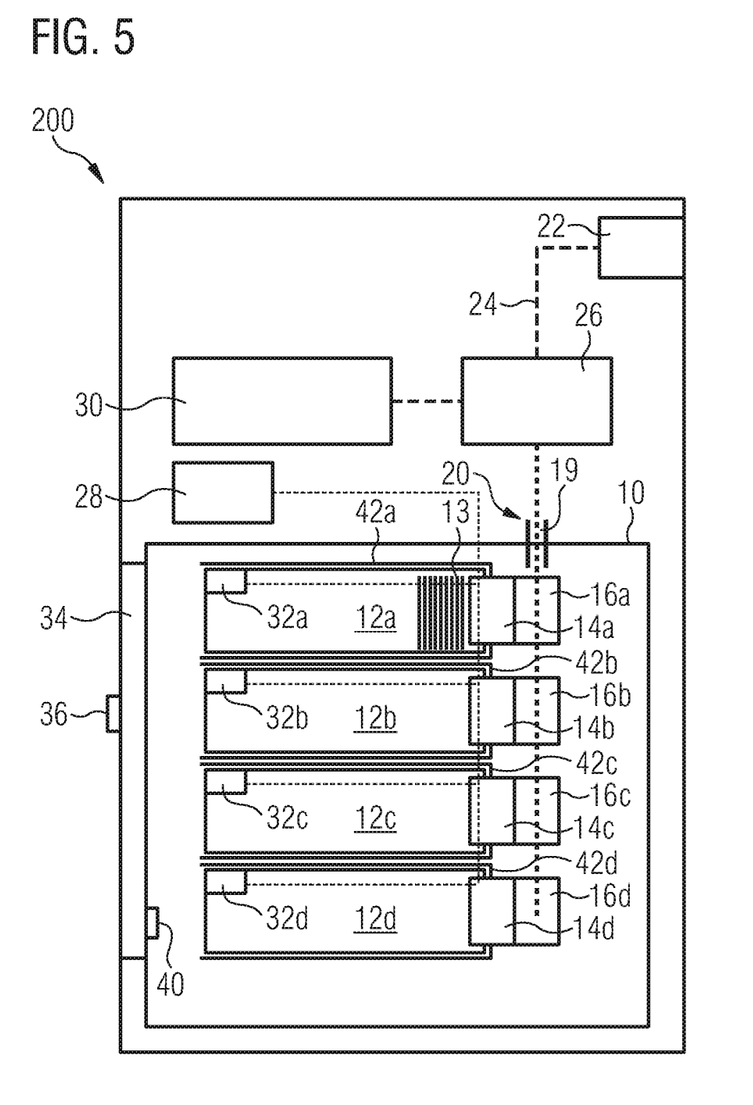
FIG. 5 is a schematic illustration of an automated teller machine according to a second embodiment in a first operating state.

FIG. 5 shows an automated teller machine 200 according to a second embodiment. Elements having the same structure and/or the same function are identified with the same reference signs. In the first operating state of the automated teller machine 200 illustrated in FIG. 5, the serial number is read in a first reading operation, in the same manner as described in the first embodiment, from the memory area of that one cash box 12a to 12d that is accommodated in the storage compartment 42d. In the present second embodiment, this corresponds to the reading of the serial number of the cash box 12d, wherein the read-out serial number is stored in a first memory area of the control unit 28.

Figure 6:
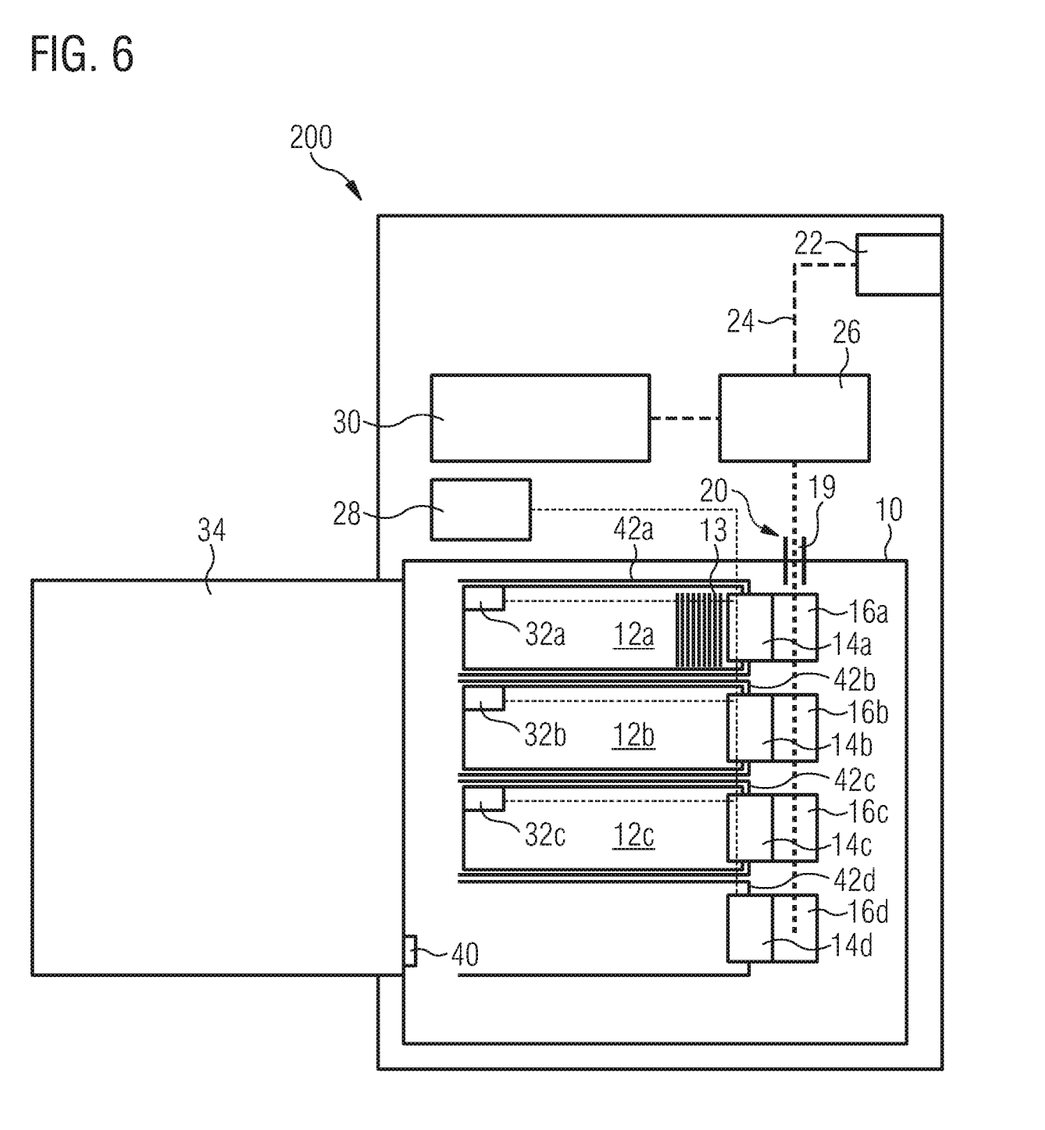
FIG. 6 is the automated teller machine according to FIG. 5 in a second operating state.

FIG. 6 shows the automated teller machine 200 according to FIG. 5 in a second operating state with the safe door 34 open, wherein the opening of the safe door 34 has been detected in the same manner as in the second operating state of the first embodiment. Further, in the second operating state according to FIG. 6, the cash box 12d has been removed from the safe 10.

Figure 7:
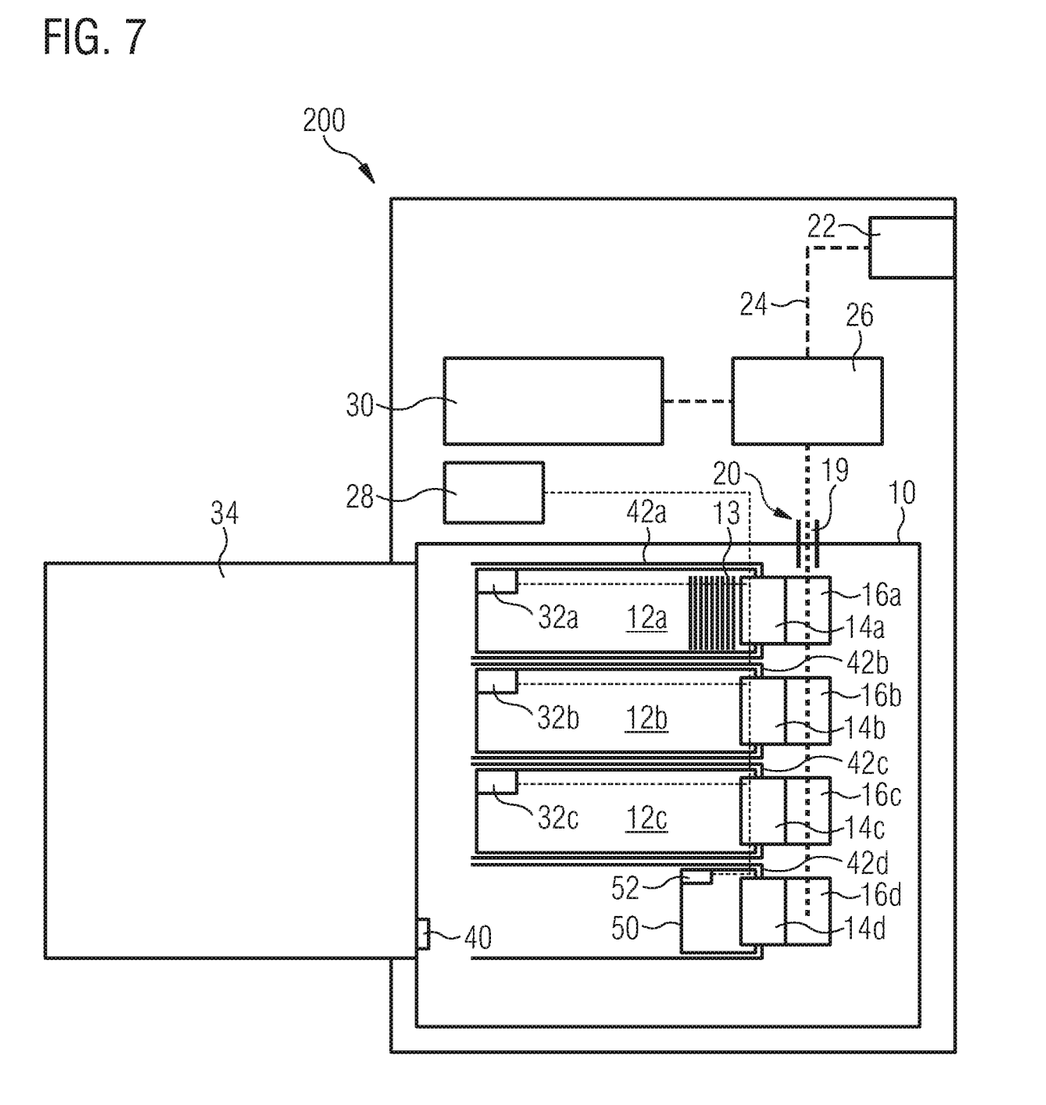
FIG. 7 is the automated teller machine according to FIG. 5 in a third operating state.

FIG. 7 shows a third operating state of the automated teller machine 200 in which a verification adapter 50 has been inserted into the storage compartment 42d instead of the cash box 12d. Preferably, a maximum admissible period of time is stored in a preset manner for the removal of the cash box 12d and the insertion of the verification adapter 50. This period of time is preset to a value in the range between 30 s and 5 minutes as from a detection of the opening of the door by the door sensor 40, and preferably to one minute.

After expiration of the maximum period of time or alternatively by a user input, a second reading operation is triggered, in which a parameter is read from a memory area 52 of the verification adapter 50 and is stored in a second memory area of the control unit 28. After termination of the second reading operation, the control unit 28 checks whether the serial number of the cash box 12d stored in the first memory area of the control unit 28 and the parameter read from the memory area of the verification adapter 50 stored in the second memory area of the control unit 28 differ from one another. When these differ from one another, the control unit 28 verifies that the safe door 34 has actually been opened.

In a further alternative embodiment, the serial number is read in the first reading operation from the memory area of that one cash box 12a to 12d that is accommodated in the storage compartment 42a, or in the storage compartment 42b, or in the storage compartment 42c. In the second operating state, that one cash box 12a, 12b or 12c is taken from the safe 10, the serial number of which has been determined in the first reading operation, wherein the verification adapter is inserted as described into the storage compartment 42a, 42b or 24c that has been emptied by the removal of the cash box 12a, 12b or 12c. The control unit 28 checks in the same manner as in the second embodiment whether the serial number of the removed cash box 12a, 12b, 12c and the parameter read from the memory area of the verification adapter 50 differ from one another.

In an alternative embodiment, the authorized user himself/herself can determine the cash box 12a to 12d to be exchanged. The rule of exchange consists in that two or more cash boxes 12a to 12d have to be exchanged, however it is not predetermined which of the cash boxes 12a to 12d have to be exchanged.

In a particularly preferred embodiment, the rule of exchange is displayed on a display unit. The display unit can be a display unit of the automated teller machine 100, 200, a display unit of at least one cash box 12a to 12d or a display unit connected to the control unit 28 of the automated teller machine. The control unit 28 in particular comprises a PC.

In a further alternative embodiment, at least one storage compartment 42a to 42d is empty in the safe 10 when the safe door 34 is closed so that the authentication of the user is performed by inserting a cash box 12a to 12d into the empty storage compartment 42a to 42d.

In a further alternative embodiment, a switch inside the safe or on the outside of the safe has to be actuated in addition to the described method steps so that the opening of the safe door is verified.

While principles and modes of operation have been explained and illustrated with regard to particular embodiments, it must be understood, however, that this may be practiced otherwise than as specifically explained and illustrated without departing from its spirit or scope.

What is claimed is:

1. A method for secure verification of opening of a safe door of a safe of an automated teller machine comprising:
   a first reading operation in which a first value of a parameter from a memory area of a cash box is read from a first storage compartment of the safe, and the first value is stored in a memory area of a control unit as a first parameter value;
   a second reading operation in which a second value of a parameter from a memory area of a cash box is read from a second storage compartment of the safe, and the second value is stored in the memory area of the control unit as a second parameter value;
   a third reading operation in which a third value of a parameter from a memory area of a cash box is read from the first storage compartment and is stored in the memory area of the control unit as a third parameter value;
   a fourth reading operation in which a fourth value of a parameter from a memory area of a cash box is read from the second storage compartment and is stored in the memory area of the control unit as a fourth parameter value;
   checking, with aid of the control unit, whether the first parameter value differs from the third parameter value and/or whether the second parameter value differs from the fourth parameter value, and
   when the first parameter value differs from the third parameter value and/or the second parameter value differs from the fourth parameter value, verifying opening of the safe door by the control unit.

2. The method according claim 1, where the control unit identifies an action of an authorized user by the verification of the actual opening of the safe door and authenticates the user by this action.

3. The method according to claim 1, where, with the aid of the control unit, a service operating mode is enabled as soon as the control unit has verified the opening of the safe door.

4. The method according claim 1 where the respective parameter value of a respective cash box corresponds to an arbitrary character sequence of letters and/or numerical values.

5. The method according claim 1 where the respective parameter value of a respective cash box corresponds to the respective serial number of the respective cash box.

6. The method according claim 1 where the respective parameter value of a respective cash box corresponds to a nominal value of notes of value that are stored in the respective cash box.

7. The method according claim 1 where the respective parameter value of a respective cash box corresponds to a unique identification of a respective RFID tag connected to the respective cash box.

8. The method according to claim 1 where the parameter values are transmitted via a secure data transmission connection from the cash boxes to the control unit.

9. A method for secure verification of opening of a safe door of a safe of an automated teller machine comprising:
   a first reading operation in which a value of a parameter from a memory area of a cash box is read from a storage compartment of the safe and is stored in a memory area of a control unit as a first parameter value;
   a second reading operation in which a value of a parameter from a memory area of a verification adapter is read from the storage compartment of the safe and is stored in the memory area of the control unit as a second parameter;
   checking, with aid of the control unit, whether the first parameter value differs from the second parameter value; and
   when the first parameter value differs from the second parameter value, verifying opening of the safe door by the control unit.

10. The method according to claim 9, wherein the first reading operation is triggered when it is signaled to the control unit with the aid of a door sensor that the safe door is closed, and that the second reading operation is triggered when it is signaled to the control unit with the aid of a door sensor that the safe door is open.

11. The method according to claim 9, wherein the first reading operation and the second reading operation are triggered by an input via an operating panel.

12. A method for secure verification of opening of a safe door of a safe of an automated teller machine comprising:
   a first reading operation in which a first value of a parameter from a memory area of a cash box is read from a first storage compartment of the safe, and the first value is stored in a memory area of a control unit as a first parameter value;
   a second reading operation in which a second value of a parameter from a memory area of a cash box is read from a second storage compartment of the safe, and the second value is stored in the memory area of the control unit as a second parameter value;
- a third reading operation in which a third value of a parameter from a memory area of a cash box is read from the first storage compartment and is stored in the memory area of the control unit as a third parameter value;
- a fourth reading operation in which a fourth value of a parameter from a memory area of a cash box is read from the second storage compartment and is stored in the memory area of the control unit as a fourth parameter value;
- a fifth reading operation in which a fifth value of a parameter from a memory area of a cash box is read from a third storage compartment of the safe and is stored in the memory area of the control unit as a fifth parameter value;
- a sixth reading operation in which a sixth value of a parameter from a memory area of a cash box is read from a fourth storage compartment of the safe and is stored in the memory area of the control unit as a sixth parameter value;
- a seventh reading operation in which a seventh value of a parameter from a memory area of a cash box is read from the third storage compartment of the safe and is stored in the memory area of the control unit as a seventh parameter value;
- an eighth reading operation in which an eighth value of a parameter from a memory area of a cash box is read from the fourth storage compartment of the safe and is stored in the memory area of the control unit as an eighth parameter value;
- checking, with the aid of the control unit, whether the first parameter value differs from the third parameter value and/or whether the second parameter value differs from the fourth parameter value and/or whether the fifth parameter value differs from the seventh parameter value and/or whether the sixth parameter value differs from the eighth parameter value; and
- when the first parameter value differs from the third parameter value and/or the second parameter value differs from the fourth parameter value and/or the fifth parameter value differs from the seventh parameter value and/or the eighth parameter value differs from the sixth parameter value, verifying opening of the safe door by the control unit.

13. The method according to claim 12, where the first and the second reading operation and/or the fifth and the sixth reading operation are triggered when it is signaled to the control unit with the aid of a door sensor that the door is closed, and that the third and the fourth reading operation and/or the seventh and the eighth reading operation are triggered when it is signaled to the control unit with the aid of the door sensor that the door is open, or that the third reading operation and the fourth reading operation and/or the seventh and the eighth reading operation are triggered by an input via an operating panel.

14. The method according claim 12, where the control unit identifies an action of an authorized user by the verification of the actual opening of the safe door and authenticates the user by this action.

15. The method according to claim 12, where, with the aid of the control unit, a service operating mode is enabled as soon as the control unit has verified the opening of the safe door.

16. The method according claim 12 where the respective parameter value of a respective cash box corresponds to an arbitrary character sequence of letters and/or numerical values.

17. The method according claim 12 where the respective parameter value of a respective cash box corresponds to the respective serial number of the respective cash box.

18. The method according claim 12 where the respective parameter value of a respective cash box corresponds to a nominal value of notes of value that are stored in the respective cash box.

19. The method according claim 12 where the respective parameter value of a respective cash box corresponds to a unique identification of a respective RFID tag connected to the respective cash box.

20. The method according to claim 12 where the parameter values are transmitted via a secure data transmission connection from the cash boxes to the control unit.

21. A device for secure verification of opening of a safe door of a safe of an automated teller machine comprising:
- a safe including a safe door, a door sensor, and a first storage compartment for storing a cash box and at least a second storage compartment for storing a cash box;
- a first cash box including a memory with a memory area in which a parameter value of the first cash box is storable;
- a second cash box including a memory with a memory area in which a parameter value of the second cash box is storable; and
- a control unit, wherein the parameter values are readable with the aid of the control unit from the memory areas of the cash boxes and are storable in a memory area of the control unit, and where and where opening of the safe door is verifiable with the aid of the control unit when the parameter value of the first cash box or the the parameter value of the second cash box differs from a subsequent parameter value of the first cash box and/or a subsequent parameter value of the second cash box respectively.

22. The device according to claim 21, where the safe door and the storage compartments are arranged relative to each other such that the cash boxes can only be removed from and/or inserted into the storage compartments when the safe door is open.

23. The device according to claim 21 where the cash boxes each include a respective RFID tag connected to the respective cash box, where the respective RFID tag includes the memory area from which the parameter value is read.

24. The device according to claim 21 further comprising one of an infrared system, WLAN, cable system or bus system for secure data transmission of the parameter values from the cash boxes to the control unit.

25. A device for secure verification of opening of a safe door of a safe of an automated teller machine comprising:
- a safe including a safe door, a door sensor, and a first storage compartment for accommodating a cash box;
- a cash box including a memory with a memory area in which a parameter value of the cash box storable;
- a verification adapter that can be accommodated in the storage compartment, the verification adapter including a memory area in which a parameter value of the verification adapter is storable; and
- a control unit, where the parameter value of the cash box and the parameter value of the verification adapter are readable and storable with the aid of the control unit, and where opening of the safe door is verifiable with the aid of the control unit when the parameter value of the cash box differs from the parameter value of the verification adapter and/or the parameter value of the cash box and/or the parameter value of the verification adapter differs from a subsequent parameter value of the cash box and/or a subsequent parameter value of the verification adapter.

26. The device according to claim 25, where the safe door and the storage compartments are arranged relative to each other such that the cash boxes can only be removed from and/or inserted into the storage compartments when the safe door is open.

27. The device according to claim 25 where the cash box and the verification adapter each include a respective RFID tag connected to the respective cash box and respective verification adapter, where the respective RFID tag includes the memory area from which the parameter value is read.

28. The device according to claim 25 further comprising one of an infrared system, WLAN, cable system or bus system for secure data transmission of the parameter values from the cash box and the verification adapter to the control unit.

\* \* \* \* \*